July 6, 1971

C. H. KLEIN ET AL 3,591,436

METHOD AND APPARATUS FOR MAKING PRINTED CORRUGATED PAPERBOARD

Filed Nov. 24, 1969

INVENTORS
Charles H. Klein
James K. Haley
BY Alfred E. Sides
Wood, Herron & Evans
ATTORNEYS July 6, 1971  C. H. KLEIN ET AL  3,591,436

METHOD AND APPARATUS FOR MAKING PRINTED CORRUGATED PAPERBOARD

Filed Nov. 24, 1969  8 Sheets-Sheet 6

INVENTORS
Charles H. Klein
James K. Haley
Alfred E. Sides
BY Wood, Herron & Evans
ATTORNEYS

United States Patent Office 3,591,436
Patented July 6, 1971

3,591,436
METHOD AND APPARATUS FOR MAKING PRINTED CORRUGATED PAPERBOARD
Charles H. Klein, James K. Haley, and Alfred C. Sides, Cincinnati, Ohio, assignors to Novelart Manufacturing Company, Cincinnati, Ohio
Continuation-in-part of application Ser. No. 281,600, May 20, 1963. This application Nov. 24, 1969, Ser. No. 872,465
Int. Cl. B31f *1/22;* B32b *31/10*
U.S. Cl. 156—210
21 Claims

ABSTRACT OF THE DISCLOSURE

Apparatus for making double face corrugated board wherein printed sheets are fed sequentially into combining rolls together with single face paper, the sheets being joined to the single face and thereafter processed in a dryer.

---

This is a continuation-in-part of application Ser. No. 281,600 filed May 20, 1963, now Pat. No. 3,306,805.

This invention relates to printed corrugated paperboard, and more particularly the invention is directed to apparatus for manufactuing corrugated paperboard in which one facing sheet is formed from a plurality of separate printed sheets.

While the invention may have many applications, it has been originally developed as a solution to a problem in the manufacture of printed corrugated board cartons for packaging goods. Printed cartons manufactured from corrugated board are not of themselves new, but until the present invention, manufacturers of such corrugated board have had imposed on them limitations as to the sizes of the corrugated boards. The limitations arise from the known apparatus for manufacturing corrugated paperboard and from the printing machines with which one of the facing sheets is printed. The manufacture of double-face corrugated paper requires three continuous webs which are fed into a corrugating machine. The machine corrugates one of the webs and adhesively joins it between the other two webs. The requirement of manufacturing corrugated board from three continuous webs confines the printing of the web to a web fed rotary press. Presses of that type are limited in that they can print only a single size display whose length must be no greater than the circumference of the printing cylinder. The box must be so designed that its dimensions or multiples of its dimensions correspond to that single size. This severe restriction in manufacture of printed corrugated paperboard has resulted in an extremely limited use of printed paperboard cartons.

The present invention arises in part from the realization that the use of printed corrugated paperboard cartons could be greatly expanded if one face of the board could be formed, at least initially, by printed sheets for there is no restriction, within practical limits, on the size of the printing on single sheets.

As an initial solution to the problem, it was proposed to print single sheets, in a sheet fed press, to join the sheets edge to edge to form a single web which could be rolled and then to send that web through a corrugating machine in a known manner. This proposal resulted in a satisfactory product; however, the cost of joining the single sheets end to end increased the cost of the resultant product to the point that it was not fully competitive with other types of packaging cartons.

It has been an objective of the invention to provide a method and apparatus for feeding printed sheets sequentially onto a moving single-face corrugated web to form a double-face corrugated board with printing on one surface of the board. The apparatus of the present invention can be used in combination with a known corrugating machine wherein a center sheet is corrugated and joined to a face sheet and that single-face web is thereafter fed into the apparatus of the present invention to receive the single sheets which form the other face of the corrugated board, the combination thereafter being passed through a drier or double facer as that term is used in the art. Alternatively, the single-face corrugated sheet can be first formed and then used in combination with the present invention as a supply roll.

It is still another objective to provide apparatus of the type described above which is adapted to handle sheets of any desired length within practical limits.

The combination of the invention includes a supply of single face corrugated paper, a sheet feeder for feeding printed paper sheets, and a combining section for combining the single face and printed paper to form double-face printed corrugated board. More particularly, the preferred embodiment of the present invention includes a supply of single-face web, a sheet feeder, a set of rolls into which the sheets and single-face web are fed to be joined and a movable stop for engaging the single sheets to assure proper registry to the sheets going into the set of rolls. Downstream of the rolls is an endless belt drier of the usual type employed with corrugating machines. In the preferred form of the invention, power is applied to the endless belt in the drier. A non-slip drive system constituted by meshing gears and/or sprockets in chains transmits power from the drier to the sheet feeder and the stop. The drive system has a variable speed transmission interposed between the drier and the feeder and stop in order to selectively vary the frequency of feeding of the sheets into the rolls and thereafter into the drier. Thus, the invention contemplates the driving of the drier, the set of rolls, and the supply of single-face web at a predetermined, fixed lineal frequency and varying the speed of feeding of the single sheets, depending upon their length in order to time the feeding of the sheets onto the single-face web to maintain a fixed lineal feed rate.

The invention further contemplates the provision of a slight overlap of the single sheets to provide assurance that there will be no exposed surface of the single-face web with adhesive applied to it passing through the drier.

It is contemplated that the invention will be used in combination with a conventional corrugating machine. In such a conventional machine, single-face corrugated paper is first formed with a facing sheet and with the corrugated sheet facing downwadly. Thereafter, the second facing sheet is fed under the single-face web and into a set of rolls where adhesive is applied to the corrugated sheet, the corrugated sheet then being secured to the second facing sheet to form double-face corrugated board. The double face is immediately fed into a drier in which the second facing sheet slides in contact with the surface of a heating table to provide the most efficient application of heat to the adhesive. This drying step is regarded as quite important to prevent warping or other distortion of the double face while accomplishing the setting of the adhesive.

In accordance with the present invention, while a conventional corrugating machine is used, its direction is reversed from that of conventional practice so that the single face moves toward the drier with the corrugated sheet facing upwardly. The printed sheets are then fed from above the single face, as contrasted to conventional practice.

In the normal corrugator, the front face which is adhesively secured to the previously formed single-face web is on the lower side of the single-face web and is raised to the temperature required for the adhesive to set by riding in direct contact with a heated plate forming the upper surface of a steam chest. With the reversal of the corrugator and the feeding of the printed sheets onto the upper surface of the single face, the adhesive cannot be set through the direct contact of the printed sheets with the surface of the steam chest. It has been an objective of the invention to provide for the setting of the adhesive by heating the belt or blanket which rides on the upper surface of the printed sheets as they move through the drying section, the heat of the blanket being transmitted through the printed sheets to the adhesive.

To secure the printed sheets to the single face, the single face passes over an applicator roll by which adhesive is transferred to the tops of the flutes of the single face and the printed sheets are fed onto the single face. If there is any slippage of the printed sheets with respect to the single face after they have contacted the single face, the adhesive shifts out of contact with the flutes, thereby impairing its securing function. To avoid such slippage, it has been an objective of the invention to provide a registration and positive feed mechanism which brings the lineal speed of the printed sheets up to the lineal speed of the single face as the sheets are fed into engagement with the single face.

In the conventional corrugator, the double face board is cut to predetermined lengths after the combining operation. A fairly simple cutting mechanism is employed and, because there is no printing on the corrugated board, a small amount of cumulative error in the cutting operation is not critical. In the present invention, on the other hand, it is of critical importance that all printed sheets be cut at substantially the same location and that no cumulative error in the cutting be permitted such as would tend to cause the cut to occur in the printed matter. Further, the printed sheets are discrete elements and even though a positive registration and feed mechanism is employed to feed them onto the single face, the printed sheets are not always necessarily positioned the same way with respect to each other. In other words, one sheet may overlap one-half inch and another sheet may overlap one-quarter inch to accommodate these variations. It has been an objective of the invention to provide a cutoff mechanism whose cutting cycle is timed to coincide with the precise longitudinal position of the printed sheet. More specifically, the cutoff mechanism includes a blade mounted on a rotatable cylinder, the rotation of the cylinder being initiated by the occurrence of a registration mark on each printed sheet.

A general objective of the present invention has been to provide a method for forming printed double face paperboard by combining single face corrugated paper with preprinted discrete sheets sequentially fed onto the fluted surface of the corrugated paper. A further general objective of the present invention has been to provide an apparatus which includes the combination of a sheet feeder, a supply of single face corrugated paper, and a combining section operative to form double face printed corrugated paper by joining single face and discrete preprinted sheets of paper.

The several features and objectives of the invention will become more readily apparent from the following detailed description taken in conjunction with the accompanying drawings in which.

THE GENERAL ORGANIZATION AND OPERATION

The invention is directed to apparatus for combining printed sheets 20 with a single-face corrugated web 21. The apparatus can be considered to have a corrugating or single facing section 22, a feeding section 23, a combining section 24, a drying section 25, and a cutoff section 26.

Figure 1:
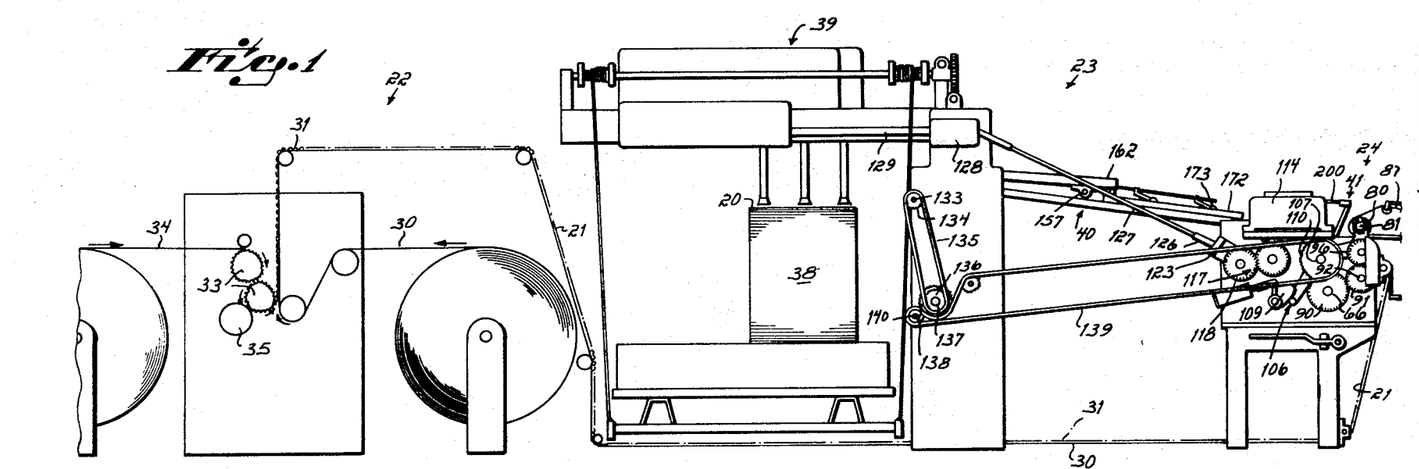
FIGS. 1 and 1A are diagrammatic side elevational views of the apparatus from the single-face section at the upstream end to the cutoff section at the downstream end.

In the single facing section, a conventional corrugating machine is used, although, as indicated above, its direction is reversed from conventional corrugating practices. In other words, in a conventional corrugating machine, the web 21 from the single facing section is normally fed with the flutes facing downwardly toward the front face. As shown in FIG. 1, the single facing section has been turned around so that the web 21 which is fed from it has a back liner 30 on the lower side and fluting 31 on the upper side, the back liner and fluting constituting what will be referred to as the single face.

The single facing section is diagrammatically illustrated and includes corrugator rolls 33 between which a web 34 passes to form the fluting. After the fluting is formed, it is contacted by a glue applicator roll 35 and is then brought into contact with the back liner 30. The corrugator rolls are steam heated to the degree necessary to cause the adhesive, usually a starch, to set by the time the single face has moved to the combining section 24.

At the combining section, the printed sheets 20 from a stack indicated at 38 are brought into contact with the fluting of the single face to which an adhesive has been previously applied. The sheets are brought to the combining section by a conventional feeder 39 which picks up the sheets 20 one at a time and shifts them onto a delivery table 40 which will be described in detail below. At the downstream end of the table, a registration and positive feed mechanism 41 feeds the sheets into engagement with the single face in a precisely timed manner to provide a slight overlap of the trailing sheet with the edge of the preceding leading sheet. The slight overlap is desired to prevent the exposure of adhesive to the drying blanket but the overlap should be kept as small as possible for it represents waste material which must be cut away from the final product.

Figure 1A:
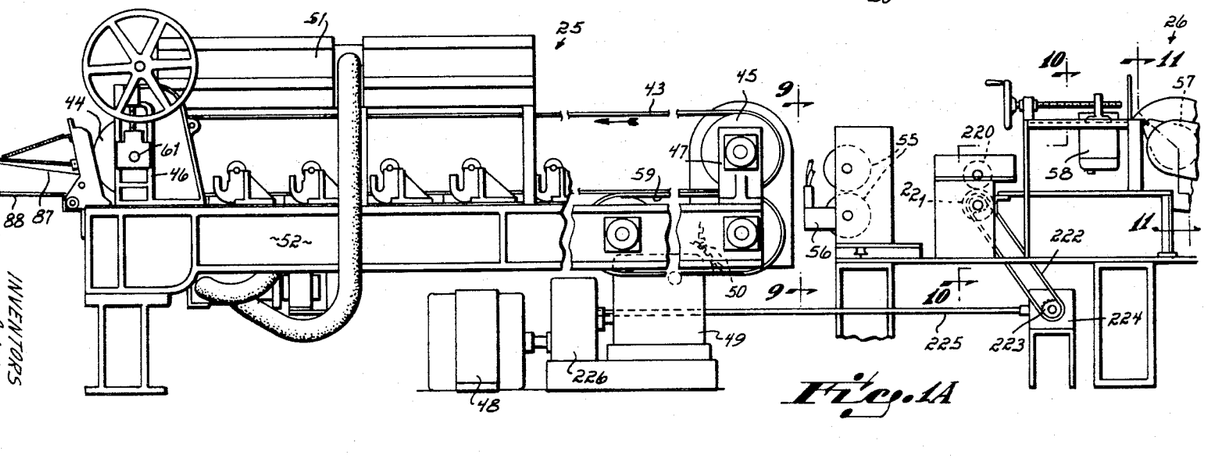
Figure 2:
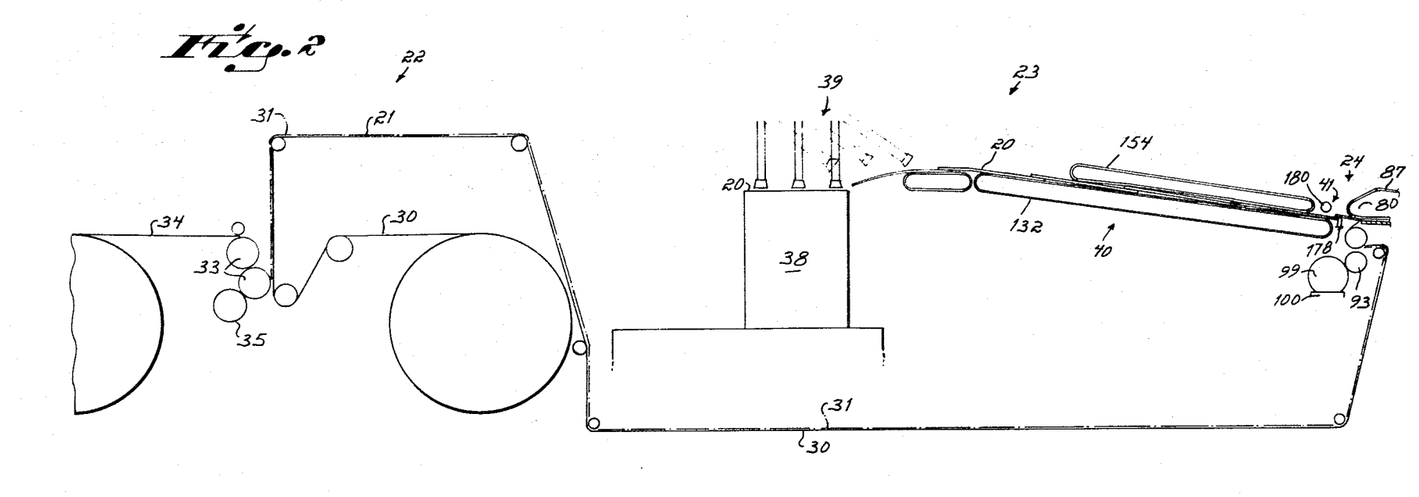
FIGS. 2 and 2A are diagrammatic side elevational views illustrating the movement of the web and sheets through the apparatus.
Figure 2A:
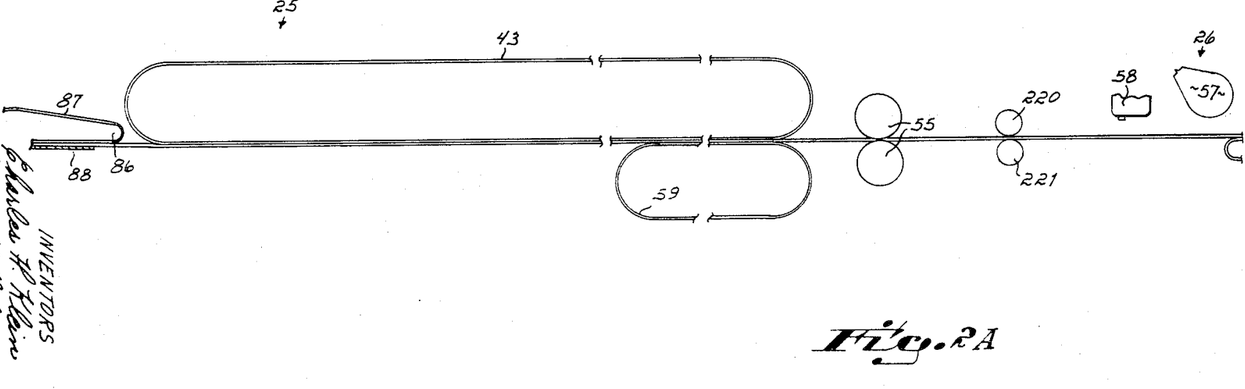

Upon contact of the printed sheets with the single face, the web becomes double face and is conveyed through the drier section 25. The main conveying element of the drier section is a long blanket or belt 43 which passes over drums 44 at the upstream end and a drive drum 45 at the downstream end, the drums being rotatably mounted in drier frame standards 46 and 47 respectively. A motor 48 is connected to the drive pulley through a suitable gearbox 49 and a gear 50 to drive the blanket 43 at a predetermined lineal speed. As will be described below, the drive for all of the critical feeding and conveying elements of the system is derived from the blanket drive so that all elements can be operated in synchronism with it.

The blanket, which moves in the direction of the arrow in FIG. 1A, as a short portion of its upper flight heated just before passing around the drum 44 and into contact with the printed sheets. To provide the heat for the blanket, a bank of infrared heaters 51 is mounted over the upper flight to raise the temperature of the upper flight to the extent necessary to effect the setting of the adhesive between the single face and the printed sheets.

Immediately below the lower flight of the blanket 45 is a steam chest 52 which has an upper surface over which the back liner of the double face rides. A small amount of heat is applied to the steam chest in order to keep the single face from getting cold. This is contrasted to conventional practice in which the temperature provided by the steam chest would be sufficient to raise a starch adhesive to a temperature of the order of 300° F. in order to set the starch adhesive. It is preferred to use a synthetic resin adhesive to secure the printed sheets to the single face in order to minimize the heat which must be applied to the printed sheets and to permit the adhesive to set as quickly as possible with such minimum heat in order to keep the length of the drying section 25 within reasonable limits.

At the downstream end of the drier the double face is trimmed along the side edges by rotary knives 55 having an electric eye device 56 of conventional design to accommodate the knives to slight lateral shifts in the double face web.

The sheets are cut to size from the web by a cutting cylinder 57 which is operated by electrical clutches to start it and to brake it. The clutches are controlled by an electric eye device 58 which detects a registration mark on the printed sheet to cause a driving clutch to be engaged. Cam means associated with the cutting cylinder cause the disengagement of the driving clutch and the engagement of the braking clutch to provide assurance that the cutting knife on the cylinder always stops at the same angular position.

DRIVE SYSTEM

Figures 3, 12:
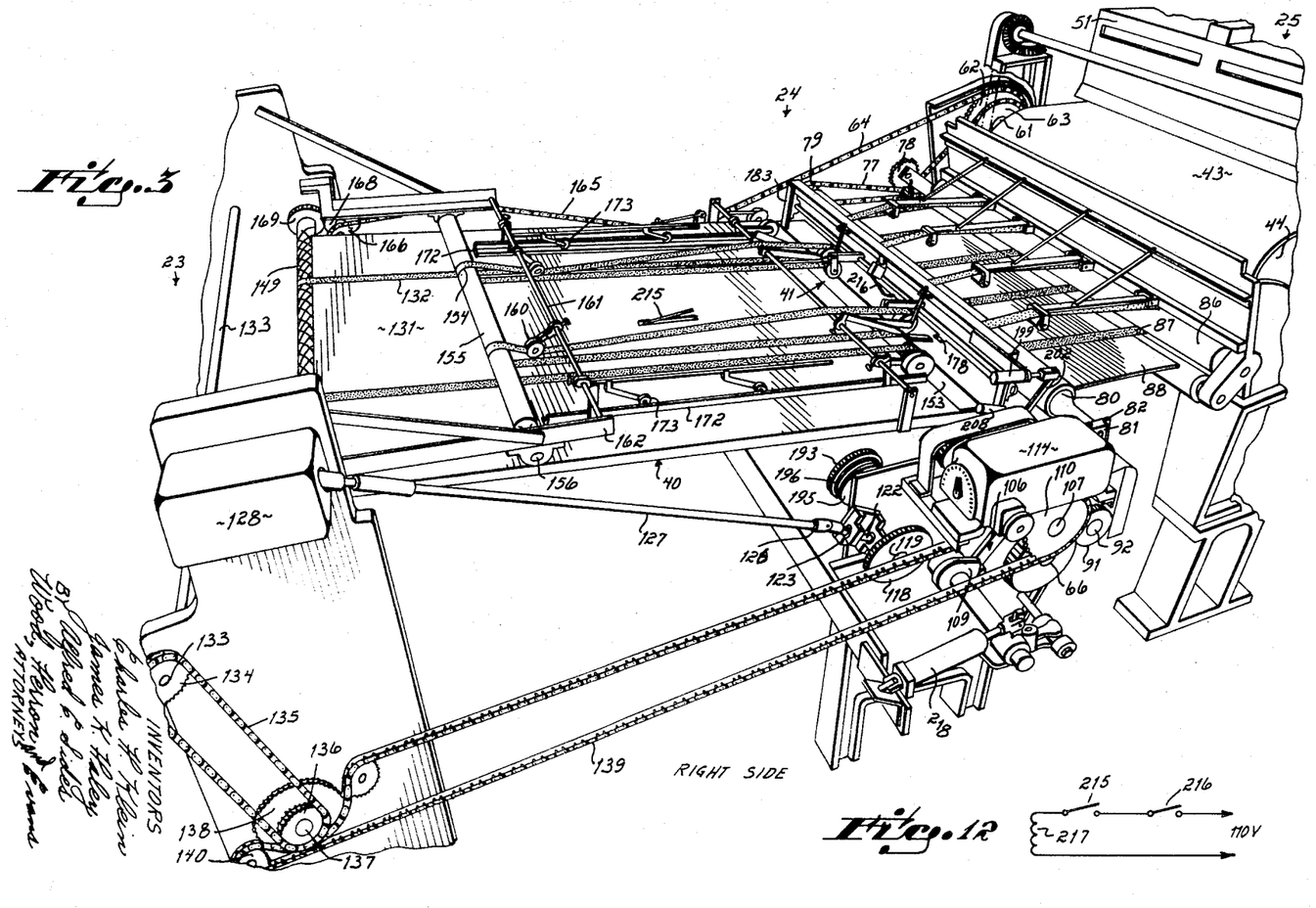
FIG. 3 is a perspective view of the sheet feeding and combining portion of the apparatus taken from the right side of the machine.
FIG. 12 is a circuit diagram of the switches in the sheet feeding portion illustrated in FIG. 3.
Figures 4, 5:
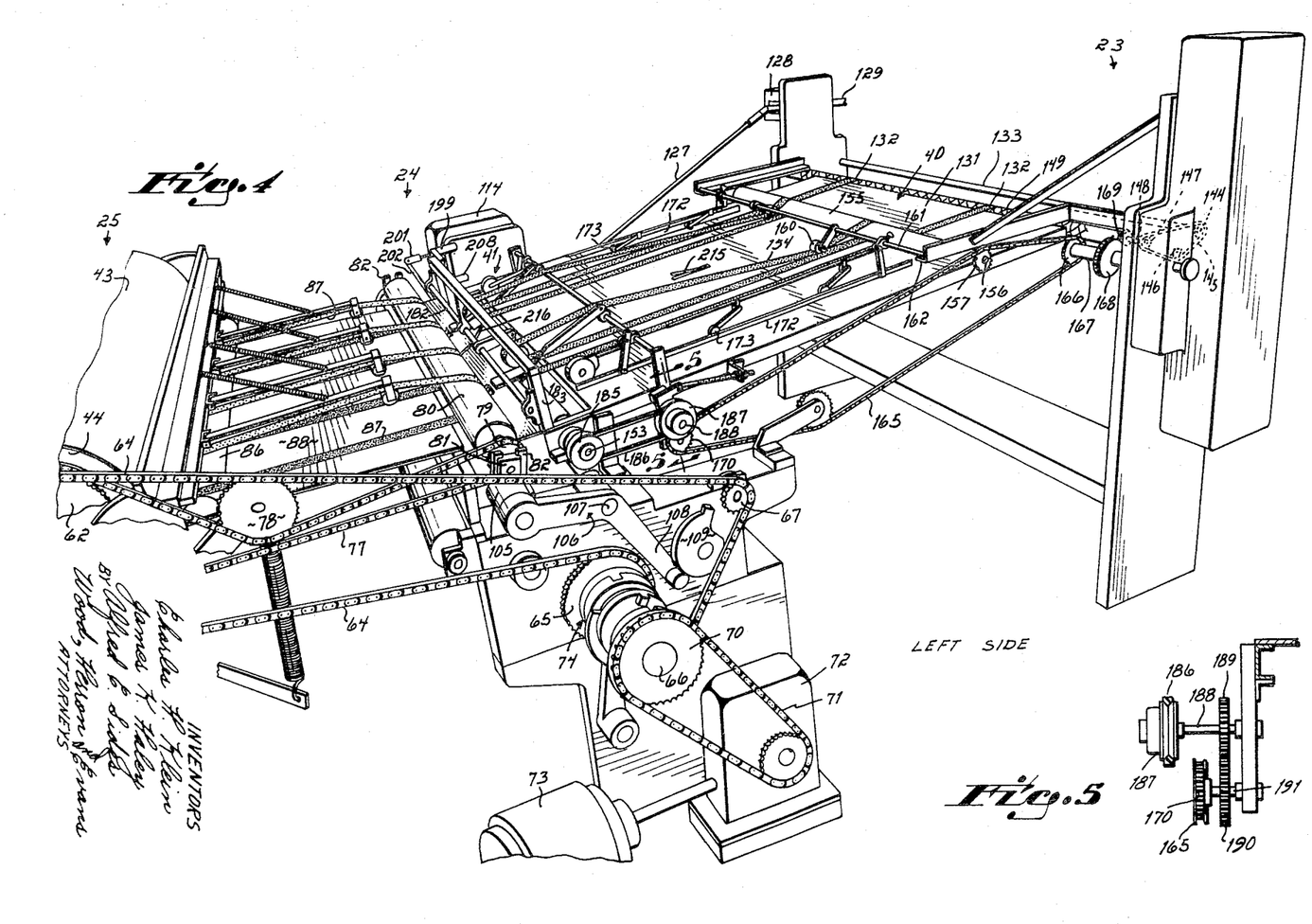
FIG. 4 is a view similar to FIG. 3 taken from the left side of the machine.
FIG. 5 is a cross sectional view taken along lines 5—5 of FIG. 4.
Figure 13:
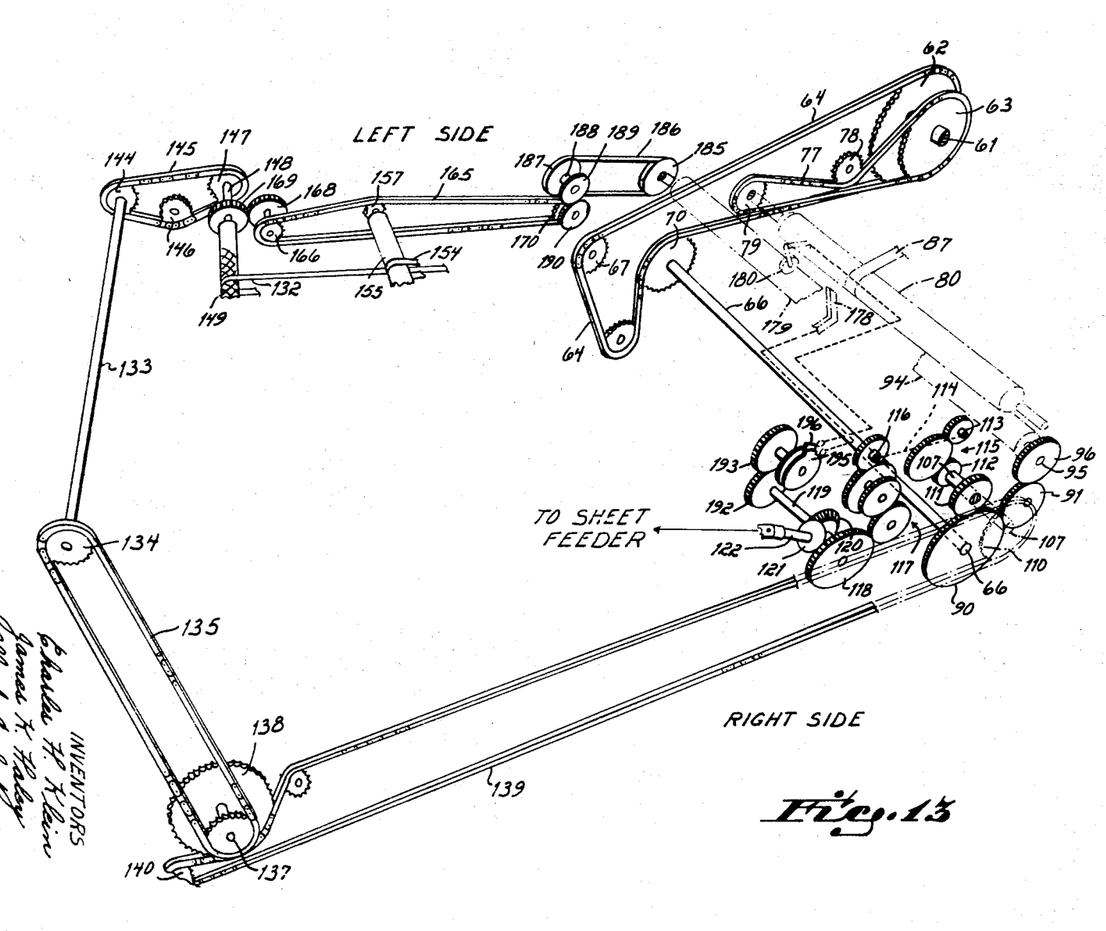
FIG. 13 is a diagrammatic perspective view of a portion of the drive system oriented with respect to FIG. 3.

Throughout this description, reference will be made to the right and left side of the apparatus as it is viewed from its upstream end and FIGS. 3, 4, and 13 are so identified.

The apparatus is driven from the main drive motor 48 located at the downstream end adjacent to the cutoff mechanism. In addition to driving the upper endless belt 43, the motor 48 drives a lower endless belt 59, the lower endless belt extending through the drying section 25. At the upstream end of the machine (the right end of FIGS. 3 and 13), the drum 44 is mounted on a shaft 61. A main drive sprocket 62 and a pull-in sprocket 63 are fixed to the shaft 61 at the left side of the apparatus. The outside or main drive sprocket 62 drives a chain 64. As best seen in FIGS. 4 and 13, the drive chain 64 passes over a driven sprocket 65 which is fixed to the main drive shaft 66. The chain then passes down and around a tension or idler sprocket (not shown) and up around another idler sprocket 67.

At the outside end of the main drive shaft 66 is a sprocket 70 over which passes an auxiliary drive chain 71 which is connected through a gearbox 72 and an auxiliary motor 73. The auxiliary motor can be connected to the main drive shaft during down time to keep the roller in the gluepot rotating to avoid the setting up of the adhesive. Immediately adjacent the sprocket 70 is a double dog clutch 74 which is manually operated in order to connect the auxiliary motor 73 to the main shaft 66 and to disconnect the main drive shaft from sprocket 65. When the double dog clutch is inwardly or toward the main sprocket 65, the main shaft 66 is connected to the main drive chain 64 and the auxiliary motor 73 is disconnected. When it is thrown outwardly toward sprocket 70, the auxiliary motor 73 is connected to drive the main shaft 66 and the drive chain 64 is disconnected.

As indicated above, the sprocket 63 is fixed to the belt drum shaft 61 and carries a chain 77. The chain 77 passes under an idler and tension sprocket 78 and over a driven sprocket 79 which is fixed to a hollow pressure roll 80. The hollow pressure roll 80 is set in a pair of journal blocks at either end, the journal blocks 81 being slidably mounted in vertical ways 82 and having adjustment screws 83 (FIG. 6) which permit fine adjustments up and down, depending on the thickness of the material. It is at this point that the first pressure is applied to the printed sheets 20 which are engaging the flutes of the single face web 21 and the pressure of application of the sheets to the fluting is very critical. The adjustment of the pressure roll is required because at least two types of corrugated material are used, the A type differing from the B type by a thickness of approximately one-eighth inch. Also, there is a difference in the thickness of the printed sheets which are to be adhered to the single face.

The pressure roll is hollow to make it lightweight and, thus, it minimizes any possibility of its crushing the fluted web as the printed sheets are joined to it.

Journalled in the drier frame is an idler roller 86 which is driven from the pressure roll by means of four endless pressure tapes 87 which pass over the two rolls. Adjacent the lower flights of the pressure tapes 87 is a bridge 88 which has a convex surface which bows up into the actual line of movement of the lower flight of the pressure tapes 87 so that the combined double face web coming from the combiner is sandwiched between the bridge and the pressure tapes.

At the right side of the machine (FIGS. 1, 3, 6, and 13), a gear 90 is fixed to the main drive shaft 66. The gear 90 meshes with a gear 91 which is fixed to a shaft 92 driving an adhesive applicating roll 93. Above the applicator roll 93 is a pull roll 94 which is on a shaft 95 driven by a sprocket 96 which meshes with the sprocket 91. The function of the pull roll 94 is to pull the single face web 21 through and up into engagement with the printed sheets 20 as they pass between the pull roll 94 and the hollow pressure roll 80 and also to apply pressure to the single face as it passes over the applicator roll so that the single face picks up the adhesive. The pull roll 94 and pressure roll 80 together form a set of combining rolls. The pull roll has an adjustment (not shown) in order to vary the spacing between it and the applicator roll in order to accommodate the varying thicknesses of single face. The applicator roll moves in contact with a glue roll 99 which is fixed to the main shaft 66 and the glue roll passes into a pan 100 of the cold adhesive to pick the adhesive up in order to transfer it to the applicator roll 93. A doctor roll 101 rotatably mounted on a bracket 102 cooperates with the glue roll to distribute a predetermined amount of adhesive evenly and uniformly over the glue roll.

The glue station of the present invention as described above differs from the glue stations of known corrugators due to the fact of the reversal of the fluting on the single face. In the present invention, additional rolls are required to present downwardly facing flutes to the applicator roll and upwardly facing flutes to receive the printed sheets.

Figure 6:
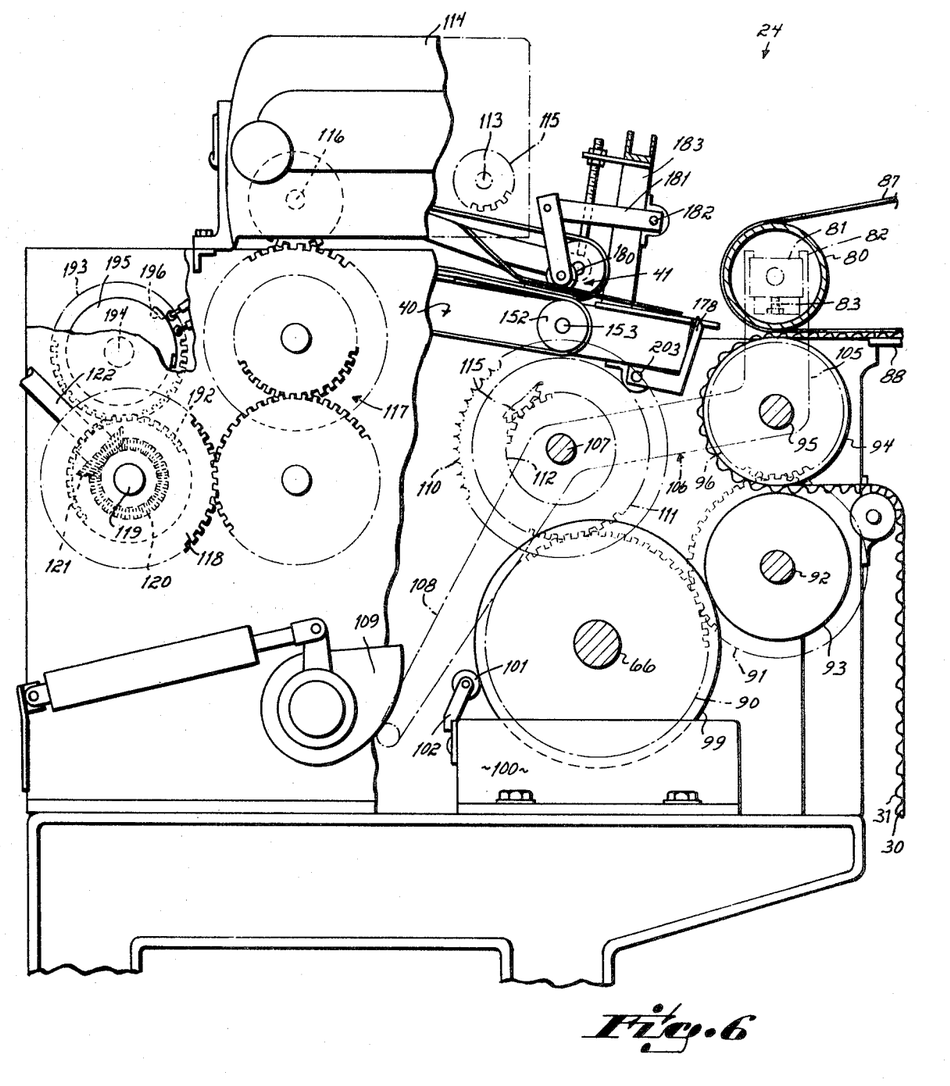
FIG. 6 is a side elevational view, partly in section, of the combining portion of the apparatus.
Figure 7:
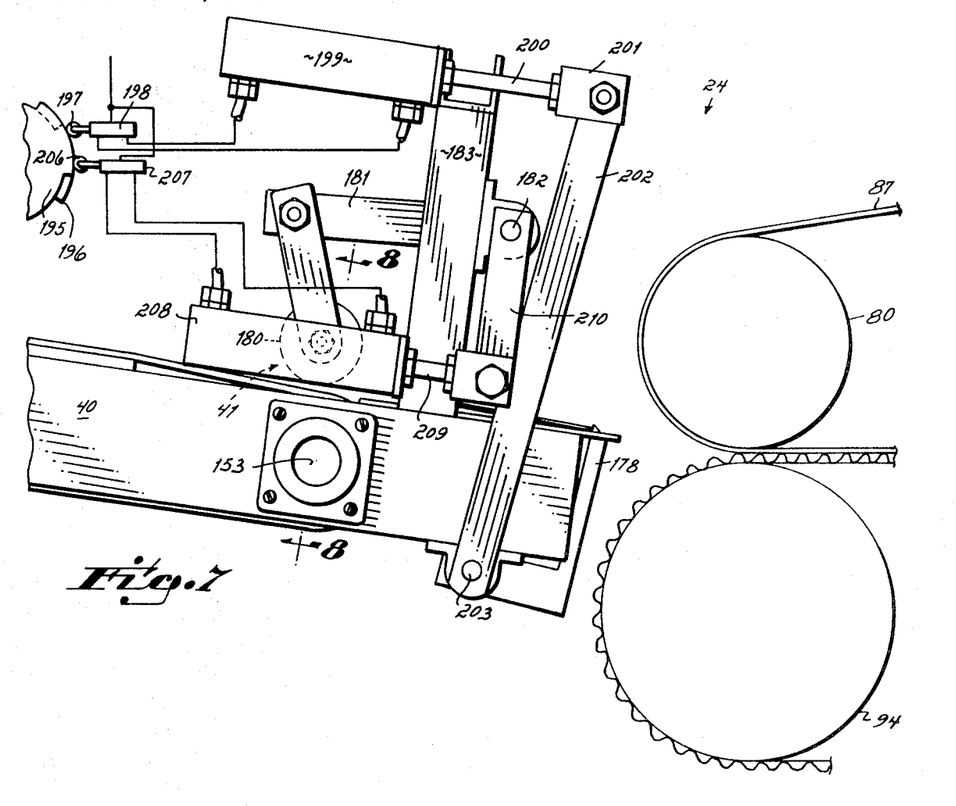
FIG. 7 is an enlarged side elevational view of the registration and feed mechanism, diagrammatically illustrating its cam and pneumatic control system.
Figure 8:
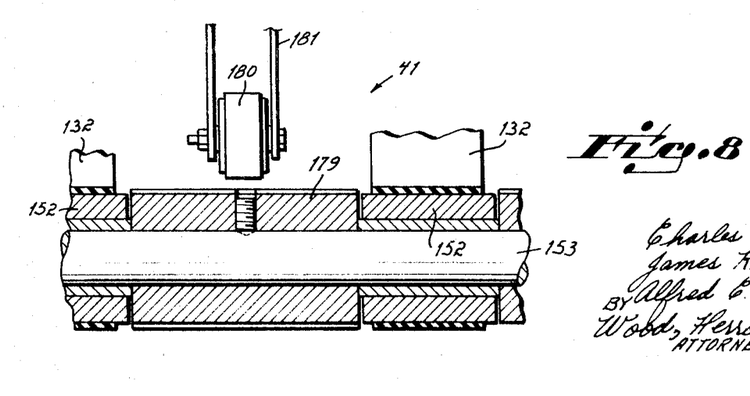
FIG. 8 is a cross sectional view taken along lines 8—8 of FIG. 7, FIGS. 9, 10, and 11 are elevational views of the cutoff mechanism taken in the direction of lines 9—9, 10—10, and 11—11 of FIG. 1A.

As shown in FIG. 6, the pull roll 94 and the hollow pressure roll 80 are mounted on one arm 105 of a bell crank lever 106 which is pivoted on a shaft 107. The other end 108 is engaged by a cam 109 which is adapted to pivot the bell crank lever either to raise the combined pull roll and pressure roll upwardly so that the single face web is out of contact with the applicator roll or, alternatively, to lower the two rolls to bring them to normal operating position in which the fluting of the single face is in contact with the applicator roll. Means, which will be described below, are provided for the automatic operation of the cam 109 depending upon the proper or improper delivery of the printed sheets to the pressure and pull rolls.

The shaft 107 is above the main shaft 66 and carries a sprocket 110. Behind the sprocket 110 is a gear 111 meshing with the gear 90 and fixed to the shaft 107 behind the gear 111 is a small gear 112. Gear 112 drives an input shaft 113 of a variable speed changer 114 through a conventional gear train 115 (FIG. 13). The speed changer provides an infinitely variable positive drive permitting a 100 percent change in speed of its output shaft 116. The output of the speed changer is connected to the sheet feeder and permits the feeding of different lengths of sheets without varying the main speed of the belt. The speed changer is adapted so that the frequency of the sheet feeder 39 may be varied approximately according to the relationship $F=R/L$ to maintain the lineal feed rate of the printed sheets substantially equal to the lineal feed rate of the single face into the combining section, where F is the frequency of the sheet feeder, R is the lineal feed rate of the single face and L is the length of the printed sheets. Thus, the frequency F is varied in direct relation to the lineal feed rate R of the single face, and in inverse relation to the length L of the printed sheets. By operating the sheet feeder according to this relationship, the sheets are combined edge-to-edge with the single face, preferably with a slight overlap at the adjacent sheet edges.

The output shaft 116 of the speed changer is connected through a chain of gears 117 to a gear 118 mounted on a stub shaft 119 which carries a small bevel gear 120. Gear 120 drives bevel gear 121 fixed to a shaft 122 journalled in a journal block 123 (FIG. 3). The shaft 122 is connected through a universal joint 126 to a shaft 127 connected into a gearbox 128.

The output shaft 129 of the gearbox 128 is connected to drive the conventional sheet feeder 39. The function of the sheet feeder 39 is to pick the printed sheets 20 up one at a time from the top of stack 38 and thrust them forward toward the combining section 24. At the downstream end of the sheet feeder the sheets are fed with a slight (three-eighths inch) overlap, end to end, into the combining apparatus. When longer sheets are used, the sheet feeder moves at a slower frequency, for the lineal speed of the main belt is not changed. In this manner, the lineal feed rate of the printed sheets (that is, the combined length of printed paper that is fed per a given time period) is maintained substantially equal to the lineal feed rate of the corrugated single face as it is fed into the combining section. Thus, approximate edge-to-edge coverage of the single-face with the printed sheets is maintained. On the other hand, the lineal speed (or actual velocity) of the sheets as they are brought into contact with the single face is always maintained equal to the lineal speed of the single face to prevent slippage upon contact. This speed relationship is maintained by feeding the printed sheets at the same speed as the tangential speed of the combining section and the main driver belt and associated apparatus.

DELIVERY TABLE

A delivery table 40 is located immediately downstream of the feeder 39. Referring to FIG. 3, the delivery table includes a top plate 131 and plurality of bottom feed tapes 132 which pass around the top plate 131 and are driven through a drive system described below by a shaft 133 having a sprocket 134 fixed to it. The sprocket 134 carries a chain 135 passing over a sprocket 136 mounted on an idler shaft 137. The shaft 137 is driven by a sprocket 138 fixed to it, the sprocket 138 being in engagement with an endless drive chain 139 which passes over a sprocket 140 at the upstream end and the sprocket 110 at the downstream end. The sprocket 110, being fixed to the shaft 107 and thus the tape drive shaft 133, is driven by the shaft 107. The shaft 133 extends laterally across the table frame and carries on its other end a sprocket 144 over which passes a chain 145. The chain 145 passes over an intermediate idler and tension sprocket 146 and drives a sprocket 147 fixed to a shaft 148 which has a knurled portion 149 for driving the tapes 132 on the delivery table. The sheets from the feeder rest on the bottom tapes 132 as they are fed into the combining apparatus. At the downstream end of the delivery table, the bottom tapes 132 pass over idler rolls 152 (FIGS. 6 and 9) which are freely rotatably mounted on a shaft 153 driven in a manner to be described below. About one-quarter of the way down the delivery table are upper tapes 154, two of them being shown, passing over a tape drive roll 155 fixed on a shaft 156 to which is fixed a drive sprocket 157. The top tapes have tension pulleys 160 fixed on a bar 161 stretching across the top of the delivery table, the bar being fixed to brackets 162. The drive sprocket 157 is driven by a chain 165 which passes over a driving sprocket 166 at its upstream end, the driving sprocket 166 being fixed on a stub shaft 167 having a gear 168 which is in mesh with a gear 169 fixed to the shaft 148 on the knurled roll 149.

At the downstream end, the chain 165 passes over a sprocket 170 and over an idler and tension sprocket 171. At each side of the delivery table are angle members 172 (FIG. 3) which act as side guides for the sheets which are adjustable in and out to accommodate different widths of sheets. Above the angle members are pressure rolls 173 which hold the edge of the sheet against the angle members.

SHEET REGISTER AND POSITIVE DRIVE

Figure 9:
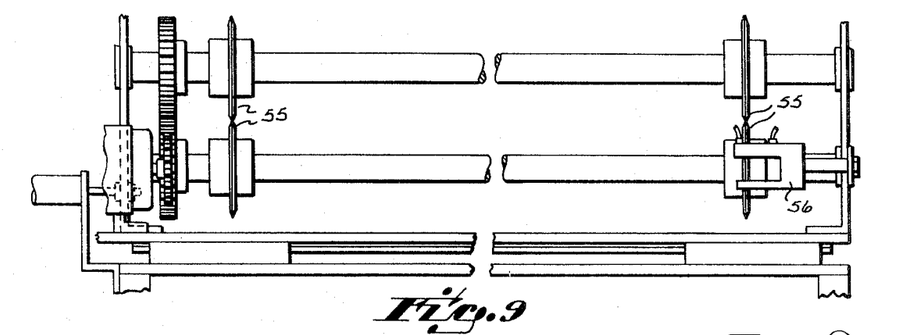

Once the sheets have been delivered down the delivery table, they are stopped by fingers 178 (FIGS. 4, 6, 7, and 13) which are operated by a mechanism which will be described below. These fingers 178 go up and down to stop the individual sheets. At the preselected time, the fingers drop down out of the way of the sheets and the sheets are positively fed into the nip between the pressure roll 80 and the pull roll 94. The positive feed of the sheets comes from the shaft 153. Fixed on the shaft 153 are spaced, knurled feed rolls 179 (FIG. 9). Immediately above the feed rolls 179 are small rubber covered pressure rolls 180 which are rotatably mounted on L-shaped brackets 181 fixed at one end to a shaft 182 journalled in a frame member 183. The rubber pressure rolls 180 are forced down toward the feed rolls intermittently by a timing mechanism which will be described below. Referring to FIGS. 4, 5, and 13, the knurled feed rolls 179 mounted on shaft 153 are driven by a pulley 185 over which a belt 186 passes, the belt 186 being driven by a variable speed pulley 187 which is mounted on a shaft 188 to which is fixed a gear 189 in mesh with a gear 190 fixed to the shaft 191 on which is mounted the sprocket 170. Peripheral speed of the knurled feed rolls 179 is exactly the lineal speed of the main belt. The objective is to press, by means of pressure rolls 180, the sheets against the knurled rolls 179 at precisely the time they are to be fed into contact with the single face so that they will have exactly the speed of the single face. Thus, no slip is permitted between the single face and the sheets. Because the glue is applied only to the top of the flutes of the single face, any slip between the sheets and the single face would wipe much of the adhesive over to the space between the flutes and lessen its ability to hold the sheets to the single face.

The timing of the operation of the fingers 178 and the small pressure rolls 180 to feed the sheets is controlled by the output shaft 116 of the speed changer 114. The speed of the output shaft 116 is determined by the length of the sheets and so, too, must the frequency of operation of the fingers and pressure rolls be determined by the length of the sheets. Referring to FIGS. 6 and 13, the output shaft 116 drives the stub shaft 119 through the gear train 117. A small gear 192 is fixed to the shaft 119 and is meshed with a gear 193 mounted on a shaft 194. A pair of cams 195 and 196 are also fixed to the shaft 194. The first cam 195 which is outside, that is, next to the speed changer, is engaged by a follower roller 197 (FIG. 7) on an air valve 198 in series with an air cylinder 199 whose operating arm 200 is connected to a yoke 201 fixed to the lever arm 202. The lever arm 202 is fixed to a rod 203 to which the fingers 178 are attached. The inside cam 196 is engaged by a follower roller 206 on a valve 207 in series with a cylinder 208. The operating arm 209 of the cylinder 208 engages a lever 210 fixed on the shaft 182 to which the brackets 181 for the rubber rolls 180 are attached.

In operation, as the cams move around in timed sequence and just before a sheet reaches the end of the delivery table, the fingers 178 are caused to pop up to stop the sheet. The fingers are held up just a few seconds until just before the sheet is to be positively driven by pressure from the pressure roll 180 and knurled roll 179. Substantially simultaneously with the fingers dropping down out of stopping position, the rubber rolls 180 drop down and push the sheets into engagement with the knurled feed roll 179 below so that the feed roll can positively drive the sheets into contact with the single face between the pressure roll 80 and the pull roll 94.

RAISING THE PULL ROLL

If for some reason the sheet feeder fails to feed a sheet, the absence of a sheet is detected and the pull roll 94 is lifted.

For this operation, two series connected microswitches 215 and 216 are mounted on the delivery table in a suitable circuit path to a solenoid operated valve 217 (FIG. 12) which controls an air cylinder 218 (FIG. 6) operatively connected to the cam 109. Both switches must be closed by contact with the printed sheets for normal operation in which the rolls 80 and 94 are in their lower position to bring the fluted edge of the single face into contact with the applicator roll 93. When either switch is open, the solenoid will be de-energized and the air cylinder 218 will cause the cam 109 to rotate, raising the hollow pressure roll 80 and the pull-in roll 94 to bring the single face out of contact with the applicator roll 93. Thus, it is not possible for the single face to carry adhesive into direct contact with the blanket.

The operation is usually as follows. The feeder fails to feed a sheet and switch 215 opens. The single face is moved out of the way of the applicator roll. The downstream switch 216 also opens. When the feeder begins to function properly and a stream of sheets moves down the delivery table, the upstream switch 215 is closed. The single face will not move into contact with the applicator roll, however, until the downstream switch 216 is also closed, thereby providing assurance that when adhesive is applied to the single face, a printed sheet will be fed into overlying contact with that adhesive.

CUTOFF SECTION

Figure 10:
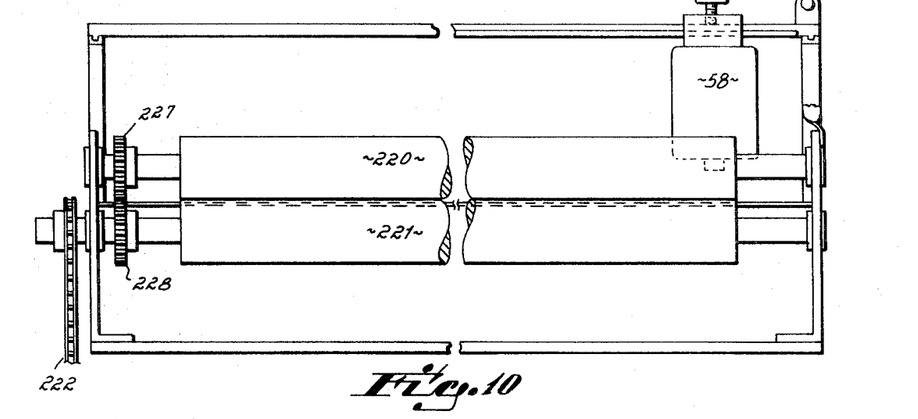
Figure 11:
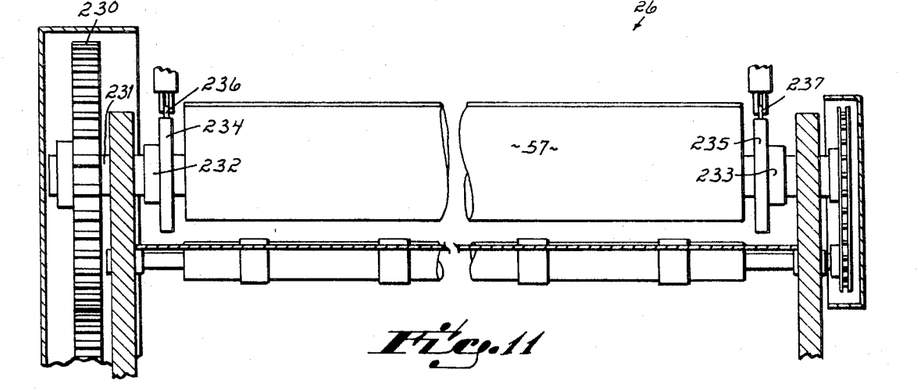

As indicated in the description of the general organization of the machine, two principal functions are performed at the cutoff section. The first is the slitting of the side edges of the web using the rotary knives 55 and the electric eye 56 for side guide register. A more critical function is performed by the transverse cutting cylinder 57. That portion of the apparatus includes a pair of pull-in rolls 220, 221 which are driven by a chain 222 passing over a sprocket 223 forming the output side of a gearbox 224 whose input is driven by a shaft 225 connected through a gear reducer 226 to the main drive motor 48. As best shown in FIG. 10, the pull rolls 220, 221 are positively driven by a pair of meshing gears 227, 228 respectively. Thus, the pull-in rolls 220, 221 are driven in synchronism with the rest of the apparatus, particularly including the blanket or belt 43 in the drier section. The pull-in rolls preferably have a peripheral speed which is approximately five percent greater than the lineal speed of the web being fed to them. This assures a constant pull on the web, thereby avoiding any tendency to bow or buckle as it moves from the drier section. The web then passes under the electric eye 58 and the registration marks on the printed sheets are detected by the electric eye to trigger the operation of the rotary cutting cylinder 57. As shown in FIG. 11, the rotary cutting cylinder is coaxial with a big driving gear 230 which is driven by a gearing and a motor (not shown) at a uniform speed. The driving gear is mounted in a shaft 231 which is journalled in a frame which supports the cutoff mechanism, the shaft terminating in a drive clutch 232 which is preferably electrically operated. The cutting cylinder 57 is connected to the driven side of the drive clutch on the left side as viewed in FIG. 11 and is connected to a brake 233 on the right side as viewed in FIG. 11. Cams 234, 235 adjacent the drive clutch 232 and the brake 233 respectively cooperate with microswitches via followers 236, 237 riding on the cams to control the operation of the clutch and brake respectively.

The operation of the cutoff cylinder is as follows: The electric eye 58 detects the registration mark on the printed sheet 20 and effects the engagement of the drive clutch 232. The cutoff cylinder 57 immediately comes to the rotative speed of the driving gear 230 and cuts the web transversely at the desired location. After the cut has been made, the driving clutch cam 234 operates the microswitch associated with follower 236 to cause the disengagement of the driving clutch 232. At a preselected angular position of the cutting cylinder 57, the microswitch follower 237 on the brake cam 235 is actuated to brake the cutting cylinder. It is important that the brake 233 stop the cutting cylinder 57 with its knife at precisely the same location on each cycle of operation, for the position of the knife at the start of the cutting operation determines the location of the cut on the web.

Through the use of the cutting mechanism as described which has a distinct target, so to speak, with each printed sheet, it is not possible for any cumulative error to creep into the operation such as would cause the transverse cut to be made grossly out of position and, further, precision in the amount of overlap of the respective printed sheets is not required to be maintained.

What is claimed is:
1. Apparatus for making double-face corrugated paper having one face formed of discrete sheets of printed paper, said apparatus comprising,
   a corrugating machine for manufacturing a web of single-face corrugated paper having an upwardly facing corrugated surface,
   a set of combining rolls for adhesively joining said printed sheets sequentially to the upwardly facing corrugated surface of said single-face web, and
   a suction feeder for feeding printed sheets sequentially into said rolls;
   a sheet feeder drive having an output connected to said sheet feeder for driving said sheet at a frequency F;
   said sheet feeder drive including a frequency varying control element effective to vary the frequency of said sheet feeder in inverse relationship to the length L of the printed sheets.

2. Apparatus according to claim 1 further comprising:
   a web feeding drive for driving said web into said combining rolls at a lineal feed rate R;
   said web feeding drive having an output connected to the input of said sheet feeder drive to vary the frequency F of said sheet feeder in direct relationship to the lineal feed rate R of the web.

3. Apparatus according to claim 1 further comprising:
   a web feeding drive for driving said web into said combining rolls at a lineal feed rate R;
   a motor having an output driveably connected to both said sheet and web feeding drives to drive one in direct relationship to the other to maintain the frequency F in direct relationship to the lineal feed rate R of the web.

4. Apparatus according to claim 3 further comprising:
   positive feed rolls connected to said web feeding drive and engageable with said sheets to drive said sheets into said combining rolls at approximately the same speed as said web.

5. Apparatus for making double-face corrugated paper having one face formed of discrete sheets of printed paper, said apparatus comprising:
   a set of combining rolls adhesively joining said printed sheets sequentially to the corrugated surface of a single-face web;
   means forming a supply of single-face web feeding into said rolls;
   a sheet feeder sequentially discharging single sheets toward said rolls with a slight overlap of each downstream sheet over the adjacent upstream sheet;
   means for feeding said sheets sequentially into said combining rolls at the lineal speed of said web; and
   a sheet feeder drive having an output connected to said sheet feeder for intermittently driving said sheet feeder at a frequency F;
   said sheet feeder drive including a frequency varying control element effective to vary the frequency of said sheet feeder in inverse relationship to the length L of the printed sheets.

6. Apparatus for making double-face corrugated paper having one face formed of discrete sheets of printed paper, said apparatus comprising:
   a corrugating machine for manufacturing a web of single-face corrugated paper having an upwardly facing corrugated surface;
   a set of combining rolls for adhesively joining said printed sheets sequentially to the upwardly facing corrugated surface of said single-face web;
   suction feeder means for feeding printed sheets sequentially into said rolls;
   positive feed rolls intermittently engageable with said printed sheets to drive said sheets into said combining rolls; and
   means for rotating at least one of said feed rolls at a peripheral speed which is the same as the lineal speed of said single-face web, whereby said sheets will be brought into contact with said web while moving at the same speed as said web.

7. Apparatus according to claim 6 in which said one feed roll rotates continuously; and further comprising
   means for bringing said other feed roll toward and away from said one feed roll at timed cyclic intervals.

8. Apparatus according to claim 7 further comprising:
   means for varying the length of time for each cycle.

9. Apparatus for making double-face corrugated paper having one face formed of discrete sheets of printed paper, said apparatus comprising:
   a corrugating machine for manufacturing a web of single-face corrugated paper having an upwardly facing corrugated surface;
   a set of combining rolls for adhesively joining said printed sheets sequentially to the upwardly facing corrugated surface of said single-face web;
   suction feeder means for feeding printed sheets sequentially into said rolls;
   a drier located adjacent said combining rolls and having a continuously moving endless belt for conveying the combined web and printed sheets through said drier;
   said belt having an upper flight and a lower flight, said lower flight normally engaging the exposed surface of said printed sheets; and
   means for heating said upper flight at the upstream end of said belt.

10. Apparatus for making double-face corrugated paper having one face formed of discrete sheets of printed paper, said apparatus comprising:
   a corrugating machine for manufacturing a web of single-face corrugated paper having an upwardly facing corrugated surface;
   a set of combining rolls for adhesively joining said printed sheets sequentially to the upwardly facing corrugated surface of said single-face web;
   suction feeder means for feeding printed sheets sequentially into said rolls;
   a transverse cutoff mechanism downstream of said combining rolls; and
   said cutoff mechanism including means for detecting a registration mark on each sheet and initiating a cutting operation upon detecting said registration mark.

11. Apparatus for making double-face corrugated paper having one face formed of discrete sheets of printed paper, said apparatus comprising:
   a set of combining rolls adhesively joining said printed sheets sequentially to the corrugated surface of a single-face web;
   means forming a supply of single-face web feeding into said rolls;
   a sheet feeder sequentially discharging single sheets toward said rolls with a slight overlap of each downstream sheet over the adjacent upstream sheet;
   means for feeding said sheets sequentially into said combining rolls at the lineal speed of said web;
   a stop adjacent said combining rolls and means for moving said stop intermittently into the path of said sheets;
   a set of positive feed rolls for driving said sheets into said combining rolls and means for intermittently moving said rolls toward each other to effect said feeding function; and
   means for timing the operation of both said moving means in accordance with the length of said sheets.

12. Apparatus for making double face corrugated paper having one face formed of discrete sheets of printed paper, said apparatus comprising,
   a set of combining rolls for adhesively joining said printed sheets sequentially to the corrugated surface of a single-face web,
   means adjacent said combining rolls for applying adhesive to said corrugated surface,
   means for decommissioning said adhesive applying means,
   means forming a supply of single face web feeding into said rolls,
   a drier having an endless belt conveyor adjacent said rolls receiving said web with said sheets joined thereto,
   means for feeding said sheets sequentially into said combining rolls at the lineal speed of said belt,
   said sheet feeding means including a delivery table over which said sheets pass prior to entering said combining rolls,
   a pair of longitudinally spaced switch means for detecting the presence of sheets being fed to said combining rolls, and
   circuit means connecting said switch means in series with each other, said circuit means being connected to the decommissioning means to decommission said adhesive applying means when either of said switch means is open.

13. Apparatus for making double face corrugated paper having one face formed of discrete sheets of printed paper, said apparatus comprising:
   a supply of single face corrugated paper having a corrugated surface;
   a combining section for adhesively joining printed sheets sequentially to the corrugated surface of said corrugated paper;
   means for feeding said single face corrugated paper into said combining section;

means for feeding printed sheets sequentially into said combining section;

timing means for controlling the frequency of said printed sheet feeding means; and means for varying said frequency approximately according to the relationship $F=R/L$ through said timing means in accordance with the length of said printed sheets to maintain the lineal feed rate of said printed sheets substantially equal to the lineal feed rate of said corrugated paper into said combining section, where F is the frequency of the sheet feeding means, R is the lineal feed rate of the single face and L is the length of the printed sheets.

14. Apparatus according to claim 13 wherein said single face corrugated paper is in the form of a continuous web.

15. Apparatus for making double face corrugated paper having one face formed of discrete sheets of printed paper, said apparatus comprising, a corrugating machine for manufacturing a web of single face corrugated paper having a corrugated surface, a combining section for adhesively joining printed sheets sequentially to the corrugated surface of said single face web, and means for feeding printed sheets sequentially into said combining section at the lineal feed rate of said web, including means for varying the frequency of said feeding means approximately according to the relationship $F=R/L$ where F is the frequency of the sheet feeding means, R is the lineal feed rate of the single face, and L is the length of the printed sheets.

16. Apparatus according to claim 15 wherein said feeding means includes:

a sheet feeder for sequentially feeding said printed sheets therefrom, and a timing mechanism correlated with said sheet feeder for controlling the timing of said printed sheets into said combining section.

17. Apparatus for making double face corrugated paper having one face formed of discrete sheets of printed paper, said apparatus comprising:

means forming a supply of a single face web having a corrugated surface;

a combining section for adhesively joining said printed sheets sequentially to the corrugated surface of said web;

web feeding means for feeding said web into said combining section;

sheet feeding means for feeding said printed sheets sequentially into said combining section;

a transmission connected between said web feeding means and said sheet feeding means for driving one of said feeding means in fixed relation to the other, and means for varying the ratio of said transmission approximately according to the relationship $F=R/L$ where F is the frequency of the sheet feeding means, R is the lineal feed rate of the single face and L is the length of the printed sheets.

18. The method of making printed double face corrugated paper comprising the steps of, printing discrete sheets of single ply paper, forming single face corrugated paper having flutes on one side thereof;

applying adhesive to the flutes of said single face paper, and separately feeding said sheets, one at a time, into engagement with the flutes of said corrugated paper, adhesively securing said discrete sheets to the flutes of said single face corrugated paper.

19. The method according to claim 18 in which said single-face corrugated paper is continuously formed as a web.

20. The method according to claim 19 in which said discrete sheets of paper are fed sequentially from a stack onto said web.

21. The method according to claim 19 in which said single face web is fed at a substantially uniform speed and in which the frequency of the feeding sheets is varied inversely with the length of said sheets to maintain the lineal feed rate of said printed sheets substantially equal to the lineal feed rate of said corrugated paper.

References Cited

UNITED STATES PATENTS

| | | | |
|---|---|---|---|
| 2,008,974 | 7/1935 | Weber | 156—516UX |
| 2,893,320 | 3/1956 | Jones | 161—52X |
| 3,058,869 | 10/1962 | Cohen | 156—522X |
| 3,306,805 | 2/1967 | Klein et al. | 156—470 |

BENJAMIN A. BORCHELT, Primary Examiner

J. M. HANLEY, Assistant Examiner

U.S. Cl. X.R.

156—207, 464, 470, 552